United States Patent Office 2,731,758
Patented Jan. 24, 1956

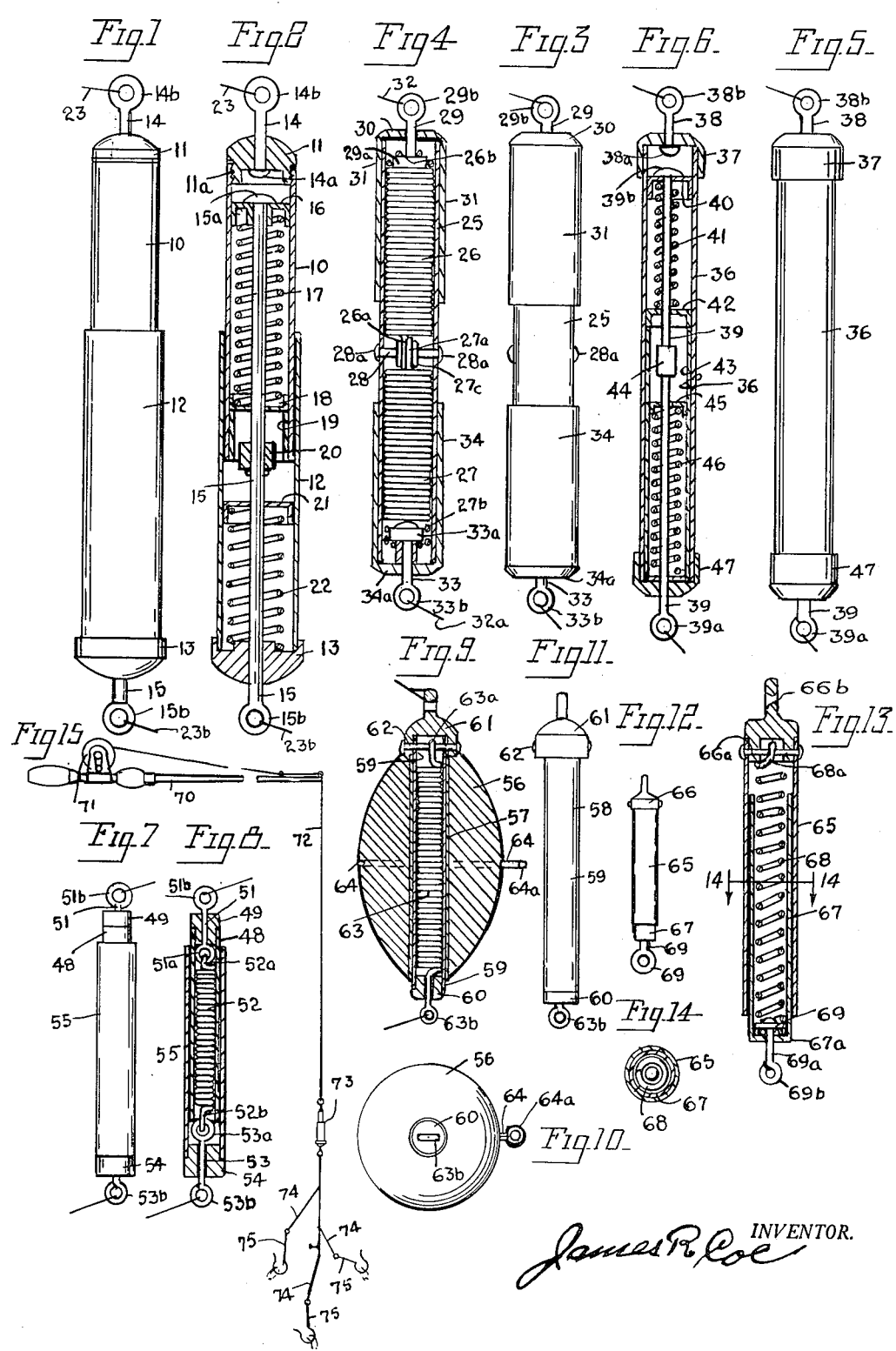

2,731,758

FISHING LINE ATTACHMENT

James R. Coe, New York, N. Y.

Application October 12, 1954, Serial No. 461,787

3 Claims. (Cl. 43—42.72)

This invention relates to a spring yielding coupling for fishing lines and particularly to a coupling between one or more fishing hooks and the main line, which will impart a lively motion to the bait attached to the fishing hooks, so that any fish nibbling at the bait will be influenced by the motion of the bait to accept it as living bait and will completely swallow the bait, so that the hook will have deeper penetration in the throat of the attacking fish, and the fisherman will be rewarded by a larger percentage of completed catches on the total number of nibbles made.

Another object of the invention is the provision of a fishing line with a spring yielding device between the line and the hooks, which includes two separate springs, so arranged that one spring will be compressed or placed under tension when a weak fish grabs a fish hook on the line, and the second spring will be compressed or placed under tension, when another weak fish grabs a fish hook connected with the line, or which will permit of both springs being compressed or placed under tension when a stronger or larger fish grabs one of the line hooks.

Another object of the invention is to provide a spring shock absorbing device for fishing lines, having a cylindrical case, separate coil springs arranged in the case, and a spring piston rod arranged to place one spring under compression or tension and then to place the other spring under compression or tension.

A still further object of the invention is to provide a float with a yielding spring connector slidably mounted within the float, so that the connector may be used with the float or without the float and the float used without the spring connector.

With the above and other objects in view the invention comprises certain new and useful constructions, combinations and arrangements of parts, clearly described in the following specification and fully illustrated in the drawings, in which:

Fig. 1 is a side elevation of one form of the invention.

Fig. 2 is a vertical sectional view therethrough.

Fig. 3 is a side elevation view of another form of the invention.

Fig. 4 is a vertical sectional view thereof through the device of Fig. 3.

Fig. 5 is a side elevation of still another form of the invention.

Fig. 6 is a vertical sectional view through the device of Fig. 5.

Fig. 7 is a side elevation of still another form of the invention.

Fig. 8 is a vertical sectional view through the device of Fig. 7.

Fig. 9 is a vertical sectional view through a float provided with a contained spring connector.

Fig. 10 is bottom end view of the device shown in Fig. 9.

Fig. 11 is a side elevation of the connector by itself.

Fig. 12 is a side elevation of another spring connection device.

Fig. 13 is an enlarged vertical sectional view through the device of Fig. 12.

Fig. 14 is a cross sectional view taken on line 14—14 of Fig. 13, looking in the direction of the arrows.

Fig. 15 is a plan view of a fishing line, showing the main line, the leader and its hooks and the position of the spring connector thereon, having the internal construction shown in Figs. 1 and 2.

Referring to Figs. 1 and 2 of the drawings, 10 designates an inner metal or plastic cylinder having an end cap 11 secured thereto by any permanent or temporary coupling system, as by screw threads 11a or by brazing or hard soldering. This tube or cylinder 10 freely slides within an outer tube or cylinder 12, on the outer end of which an end cap 13 is coupled.

A short rod 14 extends axially through the upper end cap 11, and is provided on its inner end with a head 14a which engages the end cap 11, and on its outer end is provided with a terminal eye 14b. A longer rod 15 extends slidably through the lower end cap 13, and engages on its upper end the washer or spring follower 16, by means of its head 15a. The washer or spring follower 16 has constant engagement with the coil spring 17, the lower end of which is seated on the washer 18, which engages the tubular stop 19 coupled to or formed on the wall of the inner tube or cylinder 10. The long or plunger rod 15 extends through the stop 19 and is equipped with a collar 20, which is designed to engage the lower spring follower or washer 21, when sufficient movement of the plunger rod takes place. The spring follower or washer 21 engages the coil spring 22, which engages the end cap 13.

The terminal eye 14b is connected to a fishing line section 23, and the lower end of the plunger rod 15 is provided with a terminal eye 15b which is connected to another section 23b of the fishing line, to which one or more fishing hooks 75 are connected in any manner desired.

In this construction the upper coil spring may be lighter than the lower coil spring, so that it will yield to the pull of a small fish, and when this spring is fully compressed the collar 20 will engage the lower spring follower 21 and the lower spring will then be subject to compression. This may occur if a second fish grabs one of the hooks of the fishing line, or it may occur after a strong fish grabs a fishing hook of the line and develops sufficient pull to first compress the upper spring and then the lower spring.

In Figs. 3 and 4 I show a modified form of the fishing line spring device. Within the tube or cylinder 25 an upper extension spring 26 is arranged and a lower extension spring 27 is arranged. The lower end of the upper spring 26 is provided with a terminal loop or eye 26a and the upper end of the lower spring 27 is provided with a terminal loop or eye 27a. A steel pin 28 is extended through the wall of the tube or cylinder 25 and through both of these terminal eyes, and its ends provided with heads 28a to hold it in place.

A short pull rod 29 is provided with a thrust head 29a which has a pressure bearing in the constricted end 26b of the upper spring 26, and this pull rod 29 extends through the end wall 30 of the tube or cylinder 31, which is telescopically fitted on the tube 25, and is provided with a terminal eye 29b, to receive the line section 32.

A short pull rod 33 is provided with thrust collar 33a which engages the restricted end 27b of the lower spring 27, and this short pull rod extends through the end wall 34a of the sliding outer tube or cylinder 34, and on its outer end is provided with a terminal eye 33b.

In this construction both springs are extended at the same time, and as these springs are extended the sliding outer tubes or cylinders slide outwardly, and when the springs move inwardly or collapse then these tubes also move inwardly.

In Figs. 5 and 6 I show another form of the invention, which includes the tube 36, having an end cap 37 secured to the upper end thereof, and engaged by a short rod 38, having a head 38a on its inner end and an eye 38b on its outer end.

A pull rod 39 slides within the tube 36 and is provided on its lower end with a terminal eye 39a and on its upper end with a thrust head 39b. The head 39b engages the spring follower or washer 40 of the upper coil compression spring 41, the lower end of which engages the stop 42 within the tube 36, which engages the tube end 43 fitted snugly within the tube 36.

The pull rod 39 is provided with a fixed collar 44, which is normally spaced out of contact with the follower or washer 45 of the lower compression coil spring 46, which engages the end cap 47, secured to the lower end of the tube 36.

In Figs. 7 and 8 I show another form of the invention, which includes the tube 48 having a plug 49 fitted in its upper end. A short pin 51 is extended through this plug and is provided on its inner end with a terminal eye 51a and on its outer end with a terminal eye 51b. To the inner eye 51a the terminal loop or eye 52a of the coil spring 52 is coupled. This spring is enclosed by the tube 48 and on its lower end is provided with a terminal eye 52b, which is connected to the eye 53a of the short pin 53, which extends through the plug 54, which is secured in the lower end of the tube 55, which is telescoped on the tube 48. The lower end of the pin 53 is provided with an outer eye 53b to be connected with the line.

In Figs. 9, 10 and 11 I show a combined fishing float and spring device, the float being indicated at 56, and shown to be constructed with an axial bore 57. In this axial bore the spring device 58 is slidably fitted, and this spring device includes an outer cylinder 59 having an end plug 60 secured in the lower end thereof. On the upper end of the tube the end cap 61 is fitted, and a pin 62 is driven through this end cap and the end of the tube to couple the same. The upper end of the extension spring 63 is secured by its terminal loop 63a is connected on this cross pin. The lower end of the spring 63 extends through the end cap or plug 60 and is provided with an outer terminal eye 63b. When pressure is applied to this spring it extends outwardly of the inner tube. The float is provided with a band 64 having a terminal eye 64a for the line.

This unit is designed to permit of the inclusion of the spring device in the fishing float, and when removed from the float to permit of independent use of the float or the spring device.

In Figs. 12, 13 and 14 I show another modified form of the invention, which comprises an outer tube 65, having an end plug 66 secured thereto, as by the cross pin 66a. This plug is provided with an integral terminal eye 66b. An inner tube 67 is slidably fitted in the outer tube and is provided with an end wall 67a, engaged by the extension spring 68, and this extension spring is also engaged by the washer 69 of the short pull pin 69a, which is provided on its outer end with the terminal eye 69b. The upper end of the extension spring has a looped end 68a which engages the cross pin 66a. When the pull pin 69a is pulled outwardly the inner tube will telescope outwardly, thus concealing the enclosed spring.

The actual indicated size of this device is shown in Fig. 12.

The inner terminal eyes 26a and 27a of the springs 26 and 27 are connected to each other by means of an eyelet 27c, which makes it easier for the pin 28 to be extended through both spring eyes.

In Fig. 15 I show the use of my invention in connection with a fishing pole 70, having a conventional line reel 71. The line 72 is extended to provide a drop line having the spring yielding connector 73 thereon, and below this connector a plurality of leaders 74 and baited fishing hooks 75 on these leaders, all in the usual method of fishing, with the addition of my spring yielding device to impart a resilient vertical movement to the baited hooks, when a fish nibbles at them, to impress the biting fish that there is life present, and to thus encourage full throat biting, with the result, as so often established by me, of swallowed hooks and a catch which is not lost.

It is noted that in the assembly of the fishing line shown in Fig. 15 that no sinker is employed, as the spring yielding device 73 provides sufficient weight to hold the line down.

Each and all of the spring yielding devices permits unrestrained vertical oscillation or fluctuation of the hooks suspended from the spring yielding device. There is no braking action established on the free and unrestrained up and down movement of the line, so that the line remains at all times freely elastic and yieldable to the slightest nibble of the fish, and only by this unrestrained elasticity is the fish impressed with a feeling that the bait is actually live.

Having described my invention I claim as patentable:

1. An oscillating device for fishing lines, comprising a tube having an end cap thereon and a connector on the end cap to which a line section may be secured, a second tube telescoped on the first tube and having an end cap, a spring disposed in the first tube, a stop in said first tube for said spring, a second spring disposed in the second tube against its end cap and provided with a follower engaged therewith, a rod extending through both springs and provided on its upper end with a follower to engage the first spring and provided between its ends with a stop to engage the follower of the second spring and having sliding action through the end cap of the second tube, and a line connector on said rod, whereby the first spring will be placed under compression when the rod is shifted outwardly and then the second spring will be placed under compression after the shifting of the rod.

2. A fishing line having a baitable hook on its lower end and a freely yielding spring device interposed between sections of the line above the baitable hook, said spring device including an inner cylinder having a closed upper end provided with a line connector, an outer cylinder telescoped on the inner cylinder and provided with a closed outer end, a rod sliding through the closed outer end of the outer cylinder and into the inner cylinder and provided with a line connector, a spring follower on said rod and disposed in said inner cylinder, a coil spring around said rod in said inner cylinder engaged by said spring follower, a stop for said spring secured in said inner cylinder, a second coil spring around said rod engaged with the closed end of the outer cylinder, a spring follower engaged with said second-named coil spring, and a member secured on said rod and spaced from said last-named spring follower, the first-named coil spring being yieldable under the pull of a fish and the second-named coil spring being yieldable under the pull of a larger and stronger fish only after the member on the rod is engaged with said second-named spring follower and said first-named coil spring is under partial compression from the pull of a fish on said hook, said rod being freely yieldable in said cylinders under the pull of a fish grasping said hook.

3. A spring device for fishing lines, comprising an outer cylinder, an inner cylinder having a telescopic action in the outer cylinder, a closure for the outer end of the outer cylinder, a closure for the outer end of the inner cylinder, a rod sliding through the outer cylinder closure and through both cylinders and terminating inwardly of the closure for the inner cylinder, a coil spring around said rod engaged with the closure for the outer cylinder, a closure spring around said rod spaced lengthwise from the first-named closure spring, a collar on said rod movable into pressure engagement with the first-named coil spring, a spring follower connected with the inner end of the rod and normally engaged with the outer end of the second-named coil spring, a stop for said second-named coil spring secured in the inner end of the inner cylinder, said stop being spaced from said rod collar to permit initial compression of the second-named coil spring, a line connector on the outer end of said rod, and a line connector connected with the closure for the inner cylinder, the movement of the rod in said cylinders acting to initially compress the second-named coil spring and then to compress the first-named coil spring, and to move the inner cylinder inwardly of the outer cylinder, whereby said spring device may be automatically adaptive for fish catching service with small and larger fish, and will have a spring yielding action proportionate to the physical energy of each sized fish, to impart a life simulating action to the fishing line connected with said rod and connector.

References Cited in the file of this patent

UNITED STATES PATENTS

| | | |
|---|---|---|
| 1,250,053 | Tukey | Dec. 11, 1917 |
| 1,296,370 | Darling | Mar. 4, 1919 |
| 1,444,876 | Hanson | Feb. 13, 1923 |
| 2,402,400 | Hewitt et al. | June 18, 1946 |
| 2,488,475 | Merritt | Nov. 15, 1949 |

FOREIGN PATENTS

| | | |
|---|---|---|
| 988,826 | France | Aug. 31, 1951 |